United States Patent
Douglas

(10) Patent No.: US 7,030,361 B2
(45) Date of Patent: Apr. 18, 2006

(54) RECEIVER CIRCUIT WITH "M" SECTORS EACH WITH "N" CHANNELS

(75) Inventor: Frank Beard Douglas, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 91 days.

(21) Appl. No.: 10/869,003

(22) Filed: Jun. 16, 2004

(65) Prior Publication Data

US 2005/0279918 A1    Dec. 22, 2005

(51) Int. Cl.
 *G01C 3/08* (2006.01)

(52) U.S. Cl. .............................. 250/214 R; 250/208.2; 250/214 A; 356/4.08

(58) Field of Classification Search ............. 250/208.2, 250/208.5, 214 R, 214 A; 356/4.08, 141.3, 356/400; 398/202
See application file for complete search history.

(56) References Cited

U.S. PATENT DOCUMENTS

| | | | | |
|---|---|---|---|---|
| 3,894,230 A | * | 7/1975 | Rorden et al. ............... | 356/622 |
| 5,189,484 A | * | 2/1993 | Koschmann et al. ........ | 356/138 |
| 5,343,033 A | * | 8/1994 | Cain ........................ | 250/208.2 |
| 5,693,934 A | | 12/1997 | Hohmoto et al. | |
| 5,796,689 A | | 8/1998 | Houmoto et al. | |
| 5,886,776 A | | 3/1999 | Yost et al. | |
| 6,538,790 B1 | | 3/2003 | Hatakeyama et al. | |
| 6,750,953 B1 | * | 6/2004 | Douglas ..................... | 356/4.08 |
| 6,873,413 B1 | * | 3/2005 | Douglas ..................... | 356/400 |
| 2003/0058446 A1 | | 3/2003 | Douglas | |

\* cited by examiner

*Primary Examiner*—Stephone B. Allen
(74) *Attorney, Agent, or Firm*—Dinsmore & Shohl LLP

(57) ABSTRACT

A laser beam receiver with non-interdigitated photosensors arranged in a repeating pattern of "n" channels of photosensors in each of "m" sectors is disclosed. The photocurrent from both the anode and cathode terminals of the photosensor is used to determine laser beam position. The repeating patterns connect one set of "n" channel amplifier channels with the corresponding set of "m" sector amplifier channels. The position of the laser beam is determined by its position relative to the sector and channel the laser beam impinges on. The laser beam position relative to sector boundaries is determined by the distribution of photosensor current into the "n" channels of amplifiers from the "n" photosensors within each sector. The sector of the photosensor the laser beam impinges on is determined by the distribution of photosensor current into the "m" channels of sector amplifiers from the "m" groups of "n" photosensors.

18 Claims, 3 Drawing Sheets

RECEIVER CIRCUIT WITH "M" SECTORS EACH WITH "N" CHANNELS

BACKGROUND OF THE INVENTION

The present invention generally relates to a laser beam receiver circuit and, in particular, relates to a photosensitive receiver circuit that determines the position of a laser beam from the sector and the channel of the photosensitive array impinged on by the laser beam.

Rotating laser beams and laser beam receivers are commonly used in agriculture, construction, civil engineering, machine control or surveying applications to obtain positional information about a rotating reference plane of light. Conventionally, positional information is found by sweeping a rotating laser beam over the full length of a long array of photosensors. When the rotating laser beam impinges on one of the photosensors, a signal is provided by the illuminated photosensor which is processed by appropriate circuitry and used to control an operator display or used as an input to machine control circuitry.

Many surveying and engineering applications using laser beam receivers with linear position sensing require that the receivers be relatively long, typically ranging from about six inches up to about six feet, in order for the laser beam to be detected. Additionally, such laser beam receivers may typically have four identical vertical arrays of photosensors, arranged on all four sides of a receiver, to detect laser light coming from any direction. Typically, photosensors are relatively small, and, therefore, are spaced center-to-center about 0.10 inch to about 0.30 inch in a vertical row. With this arrangement a beam of laser light will be detected regardless of the point at which it sweeps across the vertical row of photosensors. Consequently, generally between 100 and 1000 photosensors are required for receivers that are typically used in, for example, engineering and surveying applications. Manufacturing costs and circuit power requirements increase prohibitively with increasing numbers of photosensors, amplifiers and the associated circuitry. Furthermore, due to the large number of photosensors required, an impractical and expensive number of amplifier channels would be needed if each photosensor were to have its own dedicated amplifier channel.

One solution for reducing the cost of components is to group the photosensors, connecting the photosensors to a reduced number of amplifiers as was described in U.S. Pat. No. 5,886,776, issued Mar. 23, 1999. The '776 patent shows a receiver in which photosensors are divided into groups and an amplifier is connected in a repeating pattern to the outputs of non-adjacent photosensors from different groups. The position of the laser beam is determined from the location and strength of the non-zero outputs from the amplifiers. However, incorrect position information might result if the positioning laser beam were to become non-ideal, (i.e., diffused and diffracted by, for example, dust or dirt), resulting in the laser beam impinging with equal strength on more than one group of photosensors. The resulting incorrect position data from the laser beam impinging the non-adjacent photosensors is not the average of the two non-adjacent photosensor readings. Instead, the error in the reported position randomly can become a large percentage of the overall length of the photosensor array.

Another way to reduce the cost of components is to use two separate arrays of photosensors placed adjacent to each other. In this solution, one array connects to the "n" pattern amplifier channels and the other adjacent array connects to the "m" sector amplifier channels. The arrays are electrically isolated. The laser beam then impinges on both the sector and pattern photosensor at the same time, determining unambiguously the position of the beam. However, this design doubles the already large number of photosensors required and increases the size of the laser beam receiver. For these reasons, this solution is impractical.

Still another arrangement is to use only one array of photosensors and to connect the photosensors in both the "m" sector amplifier channels and the "n" pattern amplifier channels simultaneously. This is beneficial, both electrically and mechanically. One buffer amplifier is used for each photsensor so that the outputs of the buffer amplifiers are connected into the respective sets of "n" pattern amplifiers and "m" sector amplifiers through sufficient impedance to keep to a minimum the signal cross-talk between the two separate sets of amplifiers. The major drawback to this solution would be that it would require a large number of buffer amplifiers in addition to the number "m" plus "n" amplifier channels. Again this solution is impractical.

Therefore, a need exists for an improved laser beam receiver comprised of non-interdigitated photosensors divided into a repeating patterns of "n" channels of photosensors connected to smaller groups of "m" sectors where the photocurrent from both the anode and cathode terminals of the photosensor are used. In this arrangement, no additional photosensors are needed to provide a sector signal. In addition, buffer amplifiers are not needed because the photocurrent from both terminals of each photosensor is used. As a result, the cost to produce the array is significantly reduced. There is an additional need to determine more accurately the position of the laser beam by mathematical interpolation of the relative strength of the laser beam power on each of the photosensors. Further, there is also a need for a receiver that is less susceptible to producing erroneous position data when the laser spot quality is non-ideal, e.g., diffused by dust or dirt.

SUMMARY OF THE INVENTION

These needs are met by a long laser beam receiver based on an array of repeating patterns of "n" channels of photosensors divided into "m" sectors. The anodes of each "n" photosensor in each sector are connected in parallel in a repeating pattern with the corresponding anodes of the photosensors in the other sectors. The anodes, in turn, connect to a corresponding number of "n" signal amplifier channels. In addition, the cathodes of the "n" photosensors in each sector "m" are connected in parallel. The cathodes connect to a corresponding number of "m" sector signal amplifiers channels. The position of the laser beam is calculated by determining the impinged-upon photosensor's position relative to the sector boundaries, i.e., its channel position, as well as the sector the impinged-upon photosensor is in. The laser beam position relative to sector boundaries is determined by the distribution of photosensor current produced from the anodes of the impinged-upon photosensors into the "n" channels of amplifiers from the "n" photosensors within any sector. The sector the laser beam is in is determined by the distribution of photosensor current produced from the cathodes of the impinged-upon photosensors into the "m" channels of sector amplifiers from the "m" groups of "n" photosensors.

Accordingly, it is an object of the present invention to have a long non-interdigitated laser beam receiver design that is based on repeated patterns of "n" channels of photosensors in "m" sectors.

It is another object of the present invention to use the photocurrent from the anode and cathode terminals of the photosensors in order to add sector signals without additional photosensors or buffer amplifiers. The laser beam receiver obtains electronically the sector information from the same photosensors that make up the repeating channel patterns.

Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

In the following detailed description of the preferred embodiments, reference is made to the accompanying drawings that form a part hereof, and in which is shown by way of illustration, and not by way of limitation, a specific embodiment in which the invention may be practiced. It is to be understood that other embodiments may be utilized and that logical, mechanical and electrical changes may be made without departing from the spirit and scope of the present invention.

DETAILED DESCRIPTION

Figure 1:
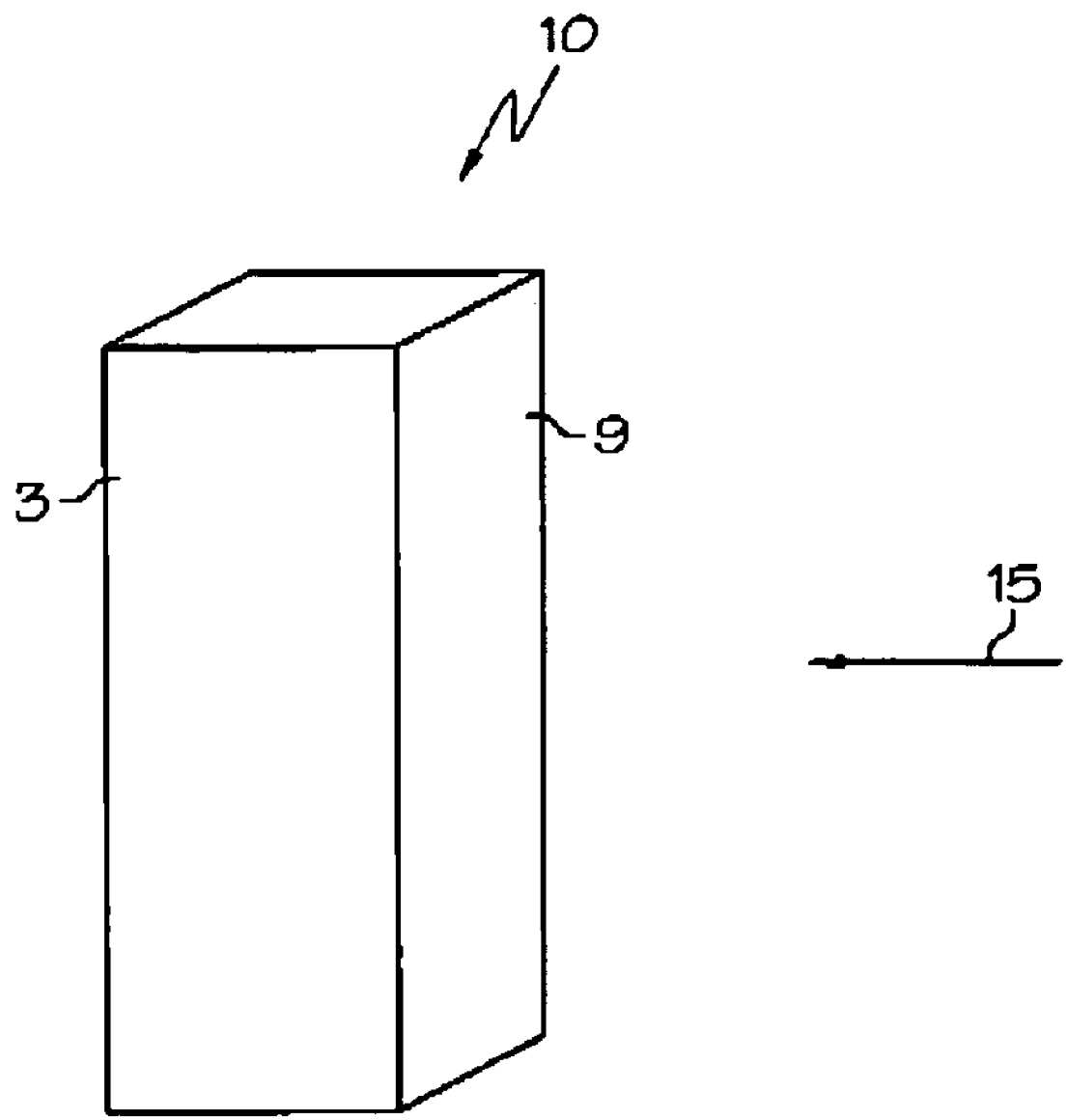
FIG. 1 is a schematic illustration of a laser beam receiver according to an embodiment of the present invention.

Referring to FIG. 1, a four-sided laser beam receiver 10 according to the present invention is shown receiving a rotating laser beam 15. Each of the four vertical sides 3, 5, 7, 9 of the receiver 10 has an array of photosensors. Each array includes a plurality of photosensors arranged in a vertical column. The four arrays of photosensors on the sides of the laser receiver 10 are identical. Each photosensor is connected electronically in parallel to the three photosensors at the same height on the three other sides of the receiver 10. The photosensors can be photocells, phototransistors, photodiodes, or PIN diodes, but are typically silicon photodiodes or PIN diodes. The four identical arrays of photosensors are arranged on the four sides of the receiver 10 to detect the rotating laser beam regardless of the direction from which it comes to the receiver 10.

Figure 2A:
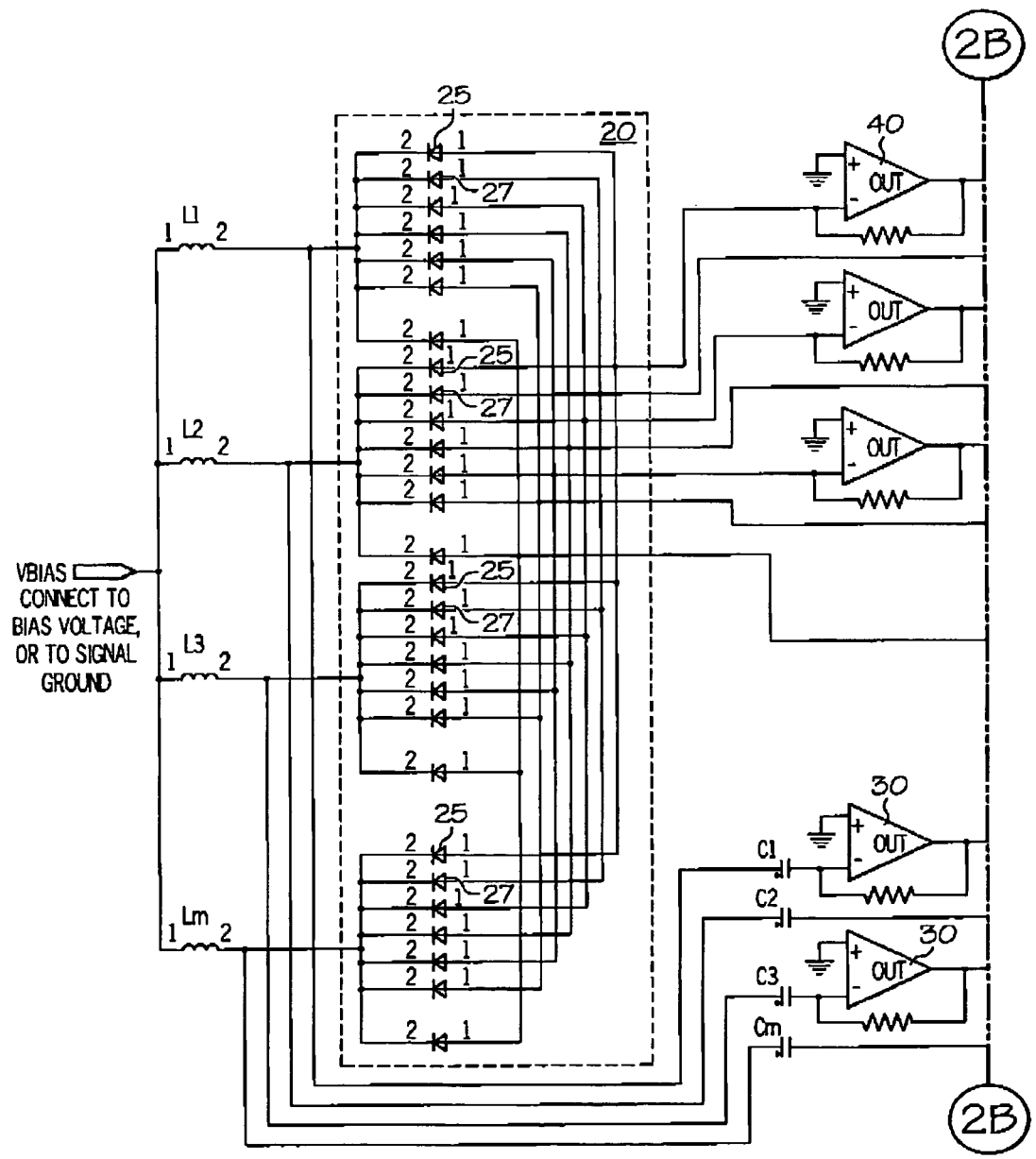
FIGS. 2A–B illustrate a schematic circuit diagram of a single array of photosensors according to an embodiment of the present invention.
Figure 2B:
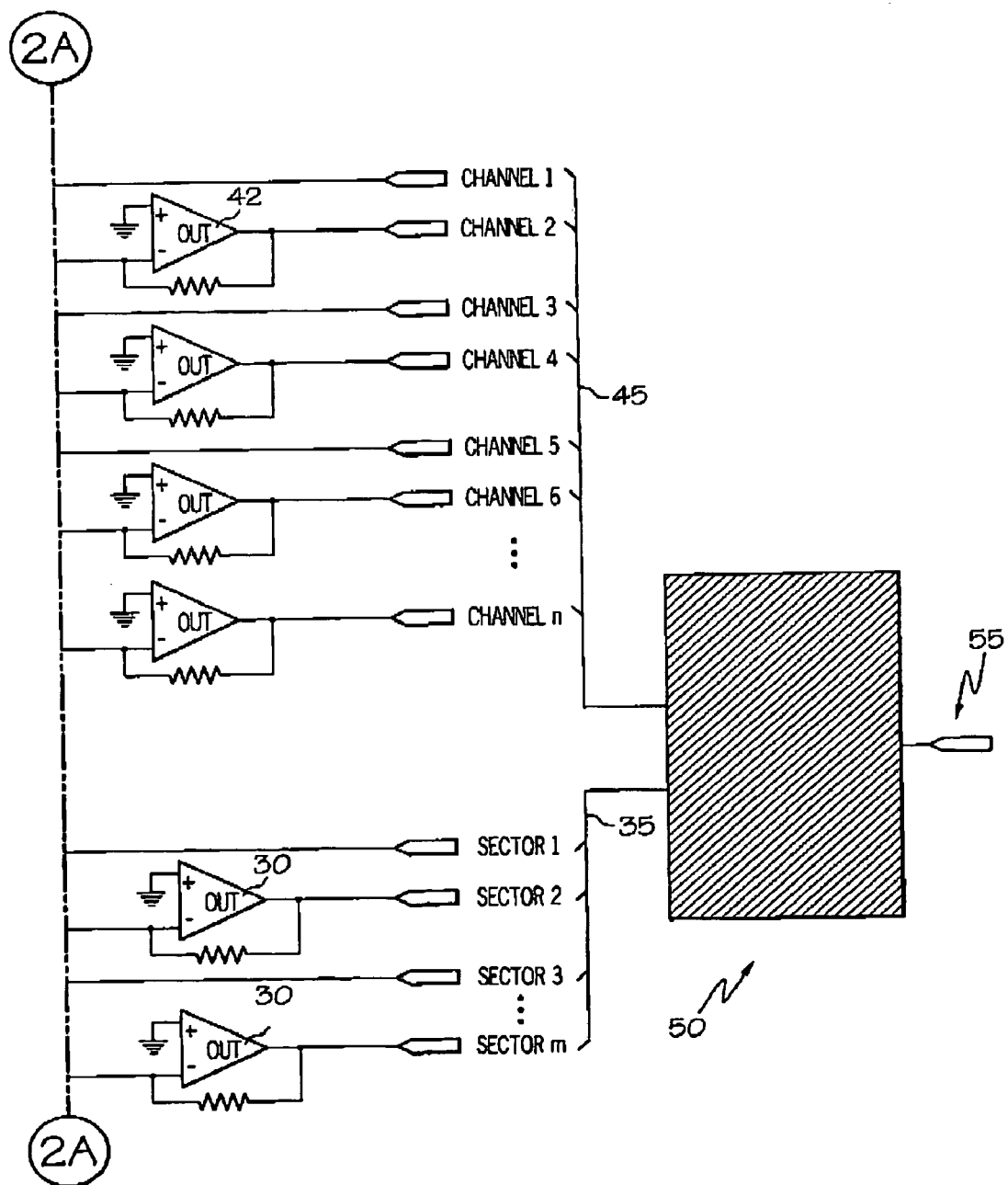

Referring to FIGS. 2A–B, a schematic circuit diagram of a single array 20 of photosensors is illustrated. The photosensors in the second, third and fourth arrays are identical to the array 20 illustrated in FIG. 2A and are connected in parallel and can possibly use the same set of amplifier channels. The photosensors of the array 20 are arranged in a vertical column divided into equal "m" groups, or sectors, each having "n" photosensors. The photosensors of the array 20 are spaced relative to one another in order to be able to detect a laser beam 15 at any position within the array 20. Typically, the centers of the photosensors are spaced from about 0.10 inch to about 0.30 inch apart. The length of each sector "m" is longer than the largest effective diameter laser beam to be detected. Typically, this length ranges between about two to four inches. This distance allows for divergence, or diffusion, of a rotating laser beam 15 by, for example, dust or dirt, over the distance from the laser source to the laser beam receiver 10 commonly used in agricultural, construction, machine control, or surveying applications.

The laser beam receiver 10 obtains separate "m" sector signals and "n" channel signals electronically by using the photocurrents produced from both the anode and cathode terminals of each photosensors. The cathodes from each photosensors in a sector are connected in parallel to a sector signal amplifier 30. For each sector in the array of photosensors 20, there is a sector signal amplifier 30 resulting in a total of "m" sector signal amplifiers 30 for each array of photosensors 20.

Additionally, there are "n" number of photosensors in each sector of the array of photosensors 20. The anodes of the first photosensor 25 in each sector relative to the sector boundaries are connected in parallel to a first channel signal amplifier 40. Similarly, the anodes of the second photosensor 27 in each sector relative to the sector boundaries are connected in parallel to a second signal amplifier 42 as illustrated in FIGS. 2A–B. The remaining anodes of each sector are connected in parallel in a similar fashion in the established pattern resulting in "n" number of channel signal amplifiers.

The output signals 35, 45 from the channel signal amplifiers and sector signal amplifiers 30 are connected to a position processor 50 as illustrated in FIG. 2B. The position processor 50 uses electronics and software to produce an output signal 55 representative of the position of the impinging rotating laser beam 15. The position processor 50 determines the laser position by mathematically interpolating the relative strength of the non-zero signals generated from the channel signal amplifiers 40 and sector signal amplifiers 30.

The laser beam position is determined by finding the specific sector and the specific channel of the photosensor impinged on and illuminated by the rotating laser beam 15. The sector is determined by which group of photosensors within the array 20 creates photosensor current at the cathode terminals of the photosensors which, in turn, produces a non-zero signal on line 35 at the input to sector signal amplifier 30, and feeding into the position processor 50. Likewise, the channel is determined by the distribution of photosensor current produced from the anode terminal of the illuminated photosensor into the channel signal amplifiers relative to the sector boundaries within any sector that produces a non-zero signal on 45 at the corresponding connected channel signal amplifier 40. By knowing the sector signal amplifiers and the channel signal amplifiers producing non-zero signals, the position processor 50 can mathematically interpolate the location of the impinged-upon photosensors and, hence, the position of the rotating laser beam 15. This information is output on 55.

If the laser beam 15 becomes excessively large in diameter through diffusion or diffraction or otherwise, and impinges on two different sectors and/or channels, the position processor 50 will be able to detect that there is a non-ideal laser beam 15 and will report an interpolated point between the two positions impinged on the array of photosensors 20.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. For example, it is contemplated by the present invention that other operational sequences and calculations of the position processor 50 are possible. More specifically, although some aspects of the present invention are identified herein as preferred or particularly advantageous, it is contemplated that the present invention is not necessarily limited to these preferred aspects of the invention.

What is claimed is:

1. A laser beam receiver for detecting the position of a laser beam, comprising:
    a plurality of photosensors arranged in an array and receptive to said laser beam being swept across said laser beam receiver;
    a plurality of sector signal amplifiers connect to cathode terminals of said plurality of photosensors;
    a plurality of channel signal amplifiers connect to anode terminals of said plurality of photosensors; and
    a position processor coupled to said plurality of section signal amplifiers and said channel signal amplifiers and receptive to photocurrent current measurements generated from said anode and cathode terminals of said plurality of photosensors to calculate the position of said laser beam sweeping across said plurality of photosensors.

2. The laser beam receiver according to claim 1, wherein said plurality of photosensors are spaced relative to one another to intercept a single laser beam.

3. The laser beam receiver according to claim 1, wherein said photosensors comprise one of photocells, phototransistors, silicon photodiodes, PIN diodes, and combinations thereof.

4. The laser beam receiver according to claim 1, wherein said array of said plurality of photosensors further comprises four identical arrays of photosensors.

5. The laser beam receiver according to claim 4, wherein said four identical arrays are connected electrically in parallel with each other.

6. The laser beam receiver according to claim 5, wherein said array of said plurality of photosensors is arranged into four identical arrays, each of said four identical arrays comprising photosensors arranged in a vertical column.

7. The laser beam receiver according to claim 4, wherein said plurality of sector signal amplifiers are connected to said four identical arrays of photosensors.

8. The laser beam receiver according to claim 4, wherein said plurality of channel signal amplifiers are connected to said four identical arrays of photosensors.

9. The laser beam receiver according to claim 1, wherein said array of said plurality of photosensors comprises a column of photosensors.

10. The laser beam receiver according to claim 1, wherein said array of said plurality of photosensors is divided into m sectors of photosensors, each of said m sectors having n photosensors.

11. The laser beam receiver according to claim 10, wherein the length of each of said m sectors is longer than the largest effective diameter laser beam to be detected.

12. The laser beam receiver according to claim 10, wherein the length of each of said m sectors is between about two inches and about four inches.

13. The laser beam receiver according to claim 10, wherein cathodes of said array of said plurality of photosensors of a sector are connected in parallel to a sector signal amplifier.

14. The laser beam receiver according to claim 10, wherein anodes of said array of said plurality of photosensors from each sector are connected in parallel to a channel signal amplifier, wherein an anode from a single photosensor from each sector are connected based on the position relative to the sector boundaries of each photosensor within each sector.

15. The laser beam receiver according to claim 1, wherein said position processor further comprises:
    input lines connected to said plurality of sector signal amplifiers and said plurality of channel signal amplifiers.

16. The laser beam receiver according to claim 1, wherein said position processor is used to calculate by mathematical interpolation the position of a laser beam based upon non-zero signal levels read at said plurality of sector signal amplifiers and said plurality of channel signal amplifiers.

17. A method of calculating a position of a laser beam swept across an array of n by m photosensors divided into m sectors, each sector having n photosensors, the method comprising:
    coupling a plurality of sector signal amplifier connected to the cathode end of each photosensor in a sector said array of photosensors and a plurality of channel signal amplifier connected to the anode end of each photosensor in each sector of said array of photosensors with a position processor; and
    calculating position of said laser beam by said position processor by mathematical interpolation of relative strength of signals generated from said plurality of sector signal amplifier and said plurality of channel signal amplifier.

18. The method according to claim 17, further comprising:
    identifying output lines from said plurality of sector signal amplifier and said plurality of channel signal amplifier having a non-zero amplified signals;
    identifying said corresponding photosensors producing photocurrent that are connected to said plurality of sector signal amplifier and said plurality of channel signal amplifier having non-zero signal levels; and
    interpolating the position of said laser beam by determining position of said photosensors producing photocurrent.

* * * * *